(12) United States Patent
Hsu

(10) Patent No.: US 11,877,546 B2
(45) Date of Patent: Jan. 23, 2024

(54) SELF-WATERING POT BASE AND METHOD FOR USING THEREOF

(71) Applicant: AC Infinity Inc., Brea, CA (US)

(72) Inventor: Daniel Yu Hsu, Upland, CA (US)

( * ) Notice: Subject to any disclaimer, the term of this patent is extended or adjusted under 35 U.S.C. 154(b) by 75 days.

(21) Appl. No.: 17/462,299

(22) Filed: Aug. 31, 2021

(65) Prior Publication Data

US 2023/0063060 A1 Mar. 2, 2023

(51) Int. Cl.
*A01G 27/00* (2006.01)
*A01G 27/06* (2006.01)

(52) U.S. Cl.
CPC ........... *A01G 27/06* (2013.01); *A01G 27/008* (2013.01)

(58) Field of Classification Search
CPC ........ A01G 27/06; A01G 27/00; A01G 31/02; A10G 27/006
See application file for complete search history.

(56) References Cited

U.S. PATENT DOCUMENTS

| 4,527,354 | A | * | 7/1985 | Sellier | A01G 27/00 47/81 |
| 5,782,035 | A | * | 7/1998 | Locke | A01G 31/02 47/79 |
| 2017/0202161 | A1 | * | 7/2017 | Eckert | A01G 27/06 |
| 2019/0261586 | A1 | * | 8/2019 | Hoff | A01G 27/00 |
| 2021/0015056 | A1 | * | 1/2021 | Main | A01G 27/06 |

FOREIGN PATENT DOCUMENTS

CN 2476171 Y * 4/2001 ............. A01G 27/00

* cited by examiner

*Primary Examiner* — Joshua J Michener
*Assistant Examiner* — Henry Hooper Mudd
(74) *Attorney, Agent, or Firm* — Tommy S F Wang; Wang IP Law Group, P.C.

(57) ABSTRACT

The present application discloses a self-watering pot base comprises a pot base, a lid and at least one absorbent. The lid is removably coupled to the pot to form an accommodation space, the lid comprises at least one leaking hole and at least one absorbent hole. The at least one absorbent passes through the at least one absorbent hole to reach the accommodation space. A method of using the aforementioned self-watering pot base is also disclosed, comprising coupling the lid and the pot base; and locating a fabric pot onto the lid.

17 Claims, 5 Drawing Sheets

SELF-WATERING POT BASE AND METHOD FOR USING THEREOF

TECHNICAL FIELD OF THE INVENTION

The present application generally relates to plant pots, and more particularly, to a self-watering pot base and a method for using thereof.

BACKGROUND OF THE INVENTION

Unlike solid pot which retain water in their containers, fabric pot promotes healthier plant growth by allowing excess water to seep out through the permeable walls. As such, the fabric pot makes the soil only retain only retain as much water as it could absorb.

Generally, the user may place a tray below the fabric pot to catch and gather the runoff water. However, the water inside the tray may attract bugs, mold and/or algae etc. It is required for the user to regularly drain the tray.

In addition, it is also required for the user to water the plants regularly, making top layer of the soil be nested by the pests since the top layer is always damped.

Therefore, a need remains for a self-watering pot base and a method of using thereof to provide a more convenient structure for fabric pot and also prevent from pests, bugs, mold and/or algae etc.

SUMMARY OF THE INVENTION

The present application discloses a self-watering pot base and a method of using thereof to provide a more convenient structure for fabric pot and also prevent from pests, bugs, mold and/or algae etc.

The self-watering pot base comprises a pot base, a lid and at least one absorbent. The lid is removably coupled to the pot to form an accommodation space, the lid comprises at least one leaking hole and at least one absorbent hole. The at least one absorbent passes through the at least one absorbent hole to reach the accommodation space.

In various exemplary embodiments, the self-watering pot base further comprises a water gauge coupled to the lid. The pot base further comprises a convex portion connecting to the accommodation space, wherein the lid further comprises a convex cover covering the convex portion. Specifically, the convex cover comprises a water gauge hole, wherein the water gauge is passed through the water gauge hole.

In various exemplary embodiments, the self-watering pot base further comprises a connector coupled between the pot base and the lid. The pot base further comprises a pot base fixer and the lid further comprises a lid fixer, the lid is coupled to the pot base by coupling the connector to the pot base fixer and the lid fixer. In detail, the lid is coupled to the pot base by inserting the connector to the pot base fixer and inserting the connector to the lid fixer. In one embodiment, the pot base fixer is located at center of the pot base and the lid fixer is located at center of the lid.

In various exemplary embodiments, wherein the lid further comprises at least one groove, wherein the at least one absorbent is located at the at least one groove. In addition, the at least one absorbent hole is located at the at least one groove.

In various exemplary embodiments, wherein the lid further comprises at least one surrounding hole located at a lid edge of the lid.

In various exemplary embodiments, wherein the lid further comprises a central hole.

In various exemplary embodiments, wherein the self-watering pot base comprises two absorbents. The lid comprises two pairs of absorbent holes, wherein both ends of each of the absorbents is passed through one pair of the absorbent holes.

In various exemplary embodiments, wherein the lid comprises a plurality of leaking holes concentrically located at the lid.

In various exemplary embodiments, wherein the at least one absorbent is liquid-absorbable.

In various exemplary embodiments, wherein the pot base comprises a bottom, a first wall, a pot base edge and a second wall. The first wall is coupled to the bottom, wherein the accommodation space is formed by the bottom and the first wall. The pot base edge is coupled to the first wall. The second wall is coupled to the pot base edge. The lid comprises a top panel, an inclined wall and a lid edge. The inclined wall is coupled to the top panel. The lid edge is coupled to the inclined wall, wherein the lid is coupled to the pot base by locating the lid edge onto the pot base edge.

A method of using the aforementioned self-watering pot base is also disclosed. The method comprises coupling the lid and the pot base; and locating a fabric pot onto the lid.

In various exemplary embodiments, wherein the self-watering pot further comprises a water gauge coupled to the lid, wherein after a step of locating the fabric pot onto the lid, the method further comprises reviewing the water gauge.

In various exemplary embodiments, wherein after a step of locating the fabric pot onto the lid, the method further comprises draining liquid located inside the accommodation space.

Based on the above, different from the current technology that the water is accumulated in pot tray, the self-watering pot base of the present application prevent the bugs, mold and/or algae from breeding in the water by coupling a lid onto the pot base.

In addition, the absorbent may absorb the liquid inside the accommodation space, delivering the liquid from bottom to top of the fabric pot. As such, the top layer of the soil may not be damped for all the time, solving the issue of nested pests.

Furthermore, the self-watering pot base may also act as a water reservoir. The user may not need to water the plants until the water inside the self-watering pot base is depleted. The user may track the amount of water by reviewing the water gauge.

Numerous other advantages and features of the present application will become readily apparent from the following detailed description of disclosed embodiments, from the claims and from the accompanying drawings.

BRIEF DESCRIPTION OF THE DRAWINGS

The objects, features and advantages of the present application will be more readily appreciated upon reference to the following disclosure when considered in conjunction with the accompanying drawings, wherein like reference numerals are used to identify identical components in the various views, and wherein reference numerals with alphabetic characters are utilized to identify additional types, instantiations or variations of a selected component embodiment in the various views, in which.

DETAILED DESCRIPTION OF DISCLOSED EMBODIMENTS

Figure 1A:
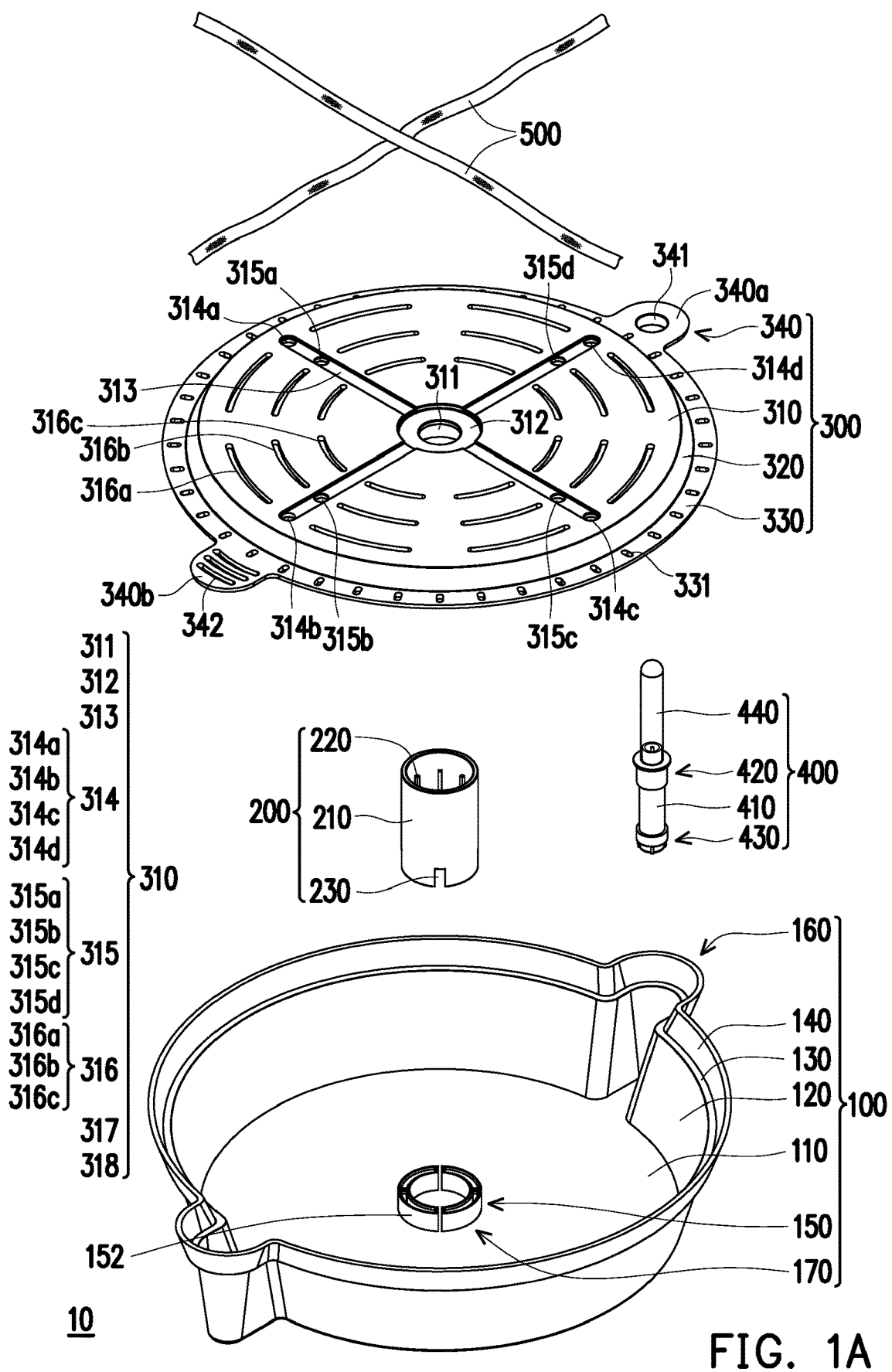
FIGS. 1A-1B are exploded views of a self-watering pot base of the present application.

Reference will now be made in detail to the present representative embodiments of the present application, examples of which are illustrated in the accompanying drawings. Wherever possible, the same reference numbers are used in the drawings and the description to refer to the same or like parts.

Figure 1B:
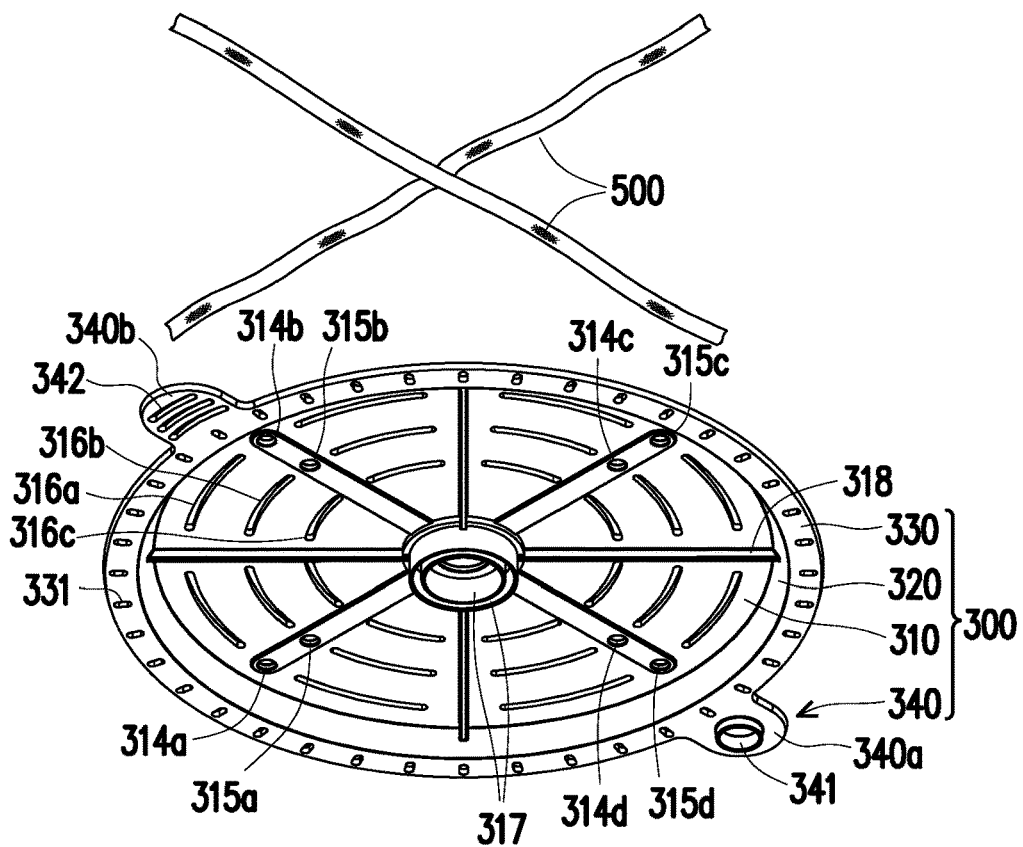
Figure 1B:
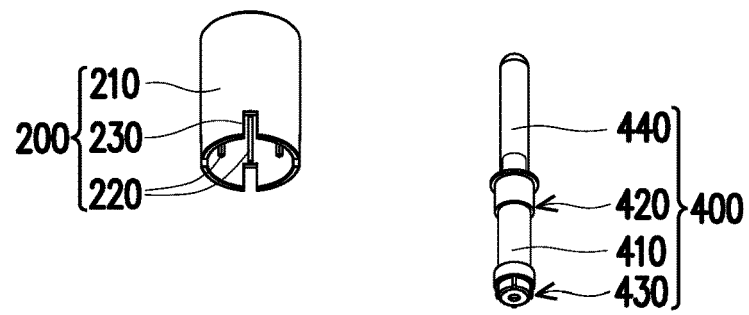
Figure 1B:
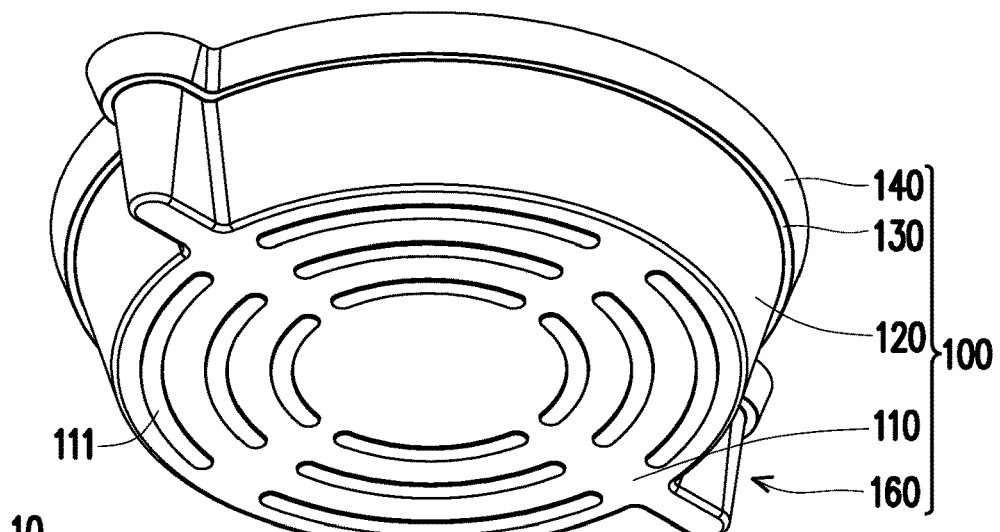

FIGS. 1A-1B are exploded views of a self-watering pot base 10 of the present application. Referring to FIGS. 1A-1B, the self-watering pot 10 comprises a pot base 100, a connector 200, a lid 300, a water gauge 400 and at least one absorbent 500.

The pot base 100 comprises a bottom 110, a first wall 120, a pot base edge 130, a second wall 140, a pot base fixer 150 and a pair of convex portions 160. The bottom base 110 and the first wall 120 are coupled together. An accommodation space 170 is formed by the bottom 110 and the first wall 120. In the present application, the bottom 110 is circular shape as an example and the first wall 120 is coupled surrounded to edge of the bottom 110 correspondingly. The bottom 110 comprises several grooves 111 at the bottom surface for increasing the friction. The pot base edge 130 is coupled to top of the first wall 120. The second wall 140 is coupled to the pot base edge 130. Specifically, the first wall 110, the pot base edge 120 and the second wall 130 form a stair-like structure.

The pot base fixer 150 is located at center of the pot base 100 as an example but not limited. More specifically, the pot base fixer 150 is located at center of the bottom 110 only for exemplary purpose. The pot base fixer 150 comprises four separated inserted portions 152 which allow the connector 200 to be inserted. More details about the pot base fixer 150 and the connector 200 will be described later with the connector 200.

The convex portions 160 are connected to the accommodation space 170. More specifically, the convex portions 160 are located at the opposite side of the accommodation space 170 and are semicircular cylinder. The convex portions 160 are formed by extending the bottom 110, the first wall 120, the pot base edge 130 and the second wall 140. In the present application, the whole structure of the pot base 100 are molded integrally as an example but is not limited.

The connector 200 comprises a body 210, ribs 220 and four notches 230. The body 210 is a hollow cylinder. The ribs 220 are located in the inner surface of the body 210 for increasing the stability of the whole structure. Each of the four inserted portions 152 is ¼ cylinder, forming a circular structure. A gap is formed between each of the inserted portions 152. The body 210 of the connector 200 is inserted to the inserted portions 152 with the edge of inserted portions 152 fixed between the notches 230.

The lid 300 comprises a top panel 310, an inclined wall 320, a lid edge 330 and a pair of convex cover 340.

The top panel 310 comprises a central hole 311, a central concave 312, at least one groove 313, at least one absorbent hole 314/315, at least one leaking holes 316, lid fixer 317 and ribs 318. The central hole 311 is located at the central concave 312, allowing the water to be leaked. In addition, the user may also lift up the lid 300 more convenient by inserting the finger into the central hole 311 and lifting the lid 300 up. The location of the central hole 311 may be modified and is not limited.

The lid 300 of the present application comprises four grooves 313 as an example but is not limited. The grooves 313 are radiated located from the central hole 311.

The top panel 310 of the present application comprises eight absorbent holes 314/315. More specifically, the top panel 310 comprises two sets of absorbent holes 314/315. Each of the sets of absorbent holes 314/315 comprises four absorbent holes. As shown in FIGS. 1A-1B, the first set of absorbent holes 314a/314b/314c/314d is located at the end of the grooves 313 correspondingly; the second set of absorbent holes 315a/315b/315c/315d is also located at the grooves 313 but nearer the central hole 311.

The lid 300 of the present application comprises a plurality of leaking holes 316. Specifically, there are three sets of leaking holes 316a/316b/316c. Each set of the leaking holes 316a/316b/316c is located at the lid 300 and is concentrically toward the central hole 311.

The lid fixer 317 is located at the bottom side of the top panel 310. The lid fixer 317 is made of two hollow cylinder as shown in FIG. 1B. The connector 200 is inserted into a gap between the two hollow of the lid fixer 317 when coupling the lid 300 with the pot base 100.

The ribs 318 are located at the bottom side of the top panel 310. The amount of the ribs 318 is not limited as long as the rib 318 could enhance the overall stability of the lid 300.

The inclined wall 320 is coupled to the top panel 310. The lid edge 330 is coupled to the inclined wall 320. The top panel 310, the inclined wall 320 and the lid edge 330 form a stair-like structure. The lid 300 is coupled to the pot base 100 by locating the lid edge 320 onto the pot base edge 130.

The lid edge 300 comprises at least one surrounding hole 331. More specifically, there is a full circle of surrounding hole 311 surrounded around the lid edge 300. The water seeped from fabric pot 600 (referring to FIG. 3) may fall down not only through leaking holes 316 but also surrounding hole 311. As such, there are more choices for the size of the fabric pot 600 (referring to FIG. 3) to put on the lid 300.

The lid comprises two of the convex covers 340. Specifically, the lid 300 comprises one convex cover 340a at one end and another one convex cover 340b at the opposite end. The convex cover 340a comprises a water gauge hole 341 for allowing the water gauge 400 pass. The shape of the wager gauge hole 341 is not limited as long as the water gauge 400 may pass. The convex cover 340b comprises at least one convex cover hole 342 for allowing the water pass.

The water gauge 400 comprises a body 410, a connector 420, an insertion 430 and a tube 440. The connector 420 and the insertion 430 are coupled at ends of the body 410. The water gauge 400 is passed through the water gauge hole 341 by inserting the insertion 430 into the water gauge hole 341. The tube 440 is coupled to the connector 420. The user may know the amount of the water inside the accommodation space of the pot base 100 by reviewing the tube 440 of the water gauge 400.

The self-watering pot base 10 of the present application comprises two absorbents 500 as an example but is not limited. The amount of the absorbent 500 may be modified as long as the water could be absorbed from the accommodation space of the pot base 100. The absorbents 500 is located at the groove 313 of the lid 300 and passed through the absorbent holes 314/315. Specifically, one of the absorbents 500 is passed through the absorbent hole 314a and the absorbent hole 314c; another one of absorbents 500 is passed through the absorbent hole 314b and the absorbent hole 314d. However, the present application is not limited thereto. The absorbents 500 may be passed through any one of the absorbent hole 314/315, depending on the shape and the size of the fabric pot 600 (referring to FIG. 3).

The absorbents 500 are liquid-absorbable. In the present application, the absorbents 500 are rope as an example but is not limited.

Figure 2A:
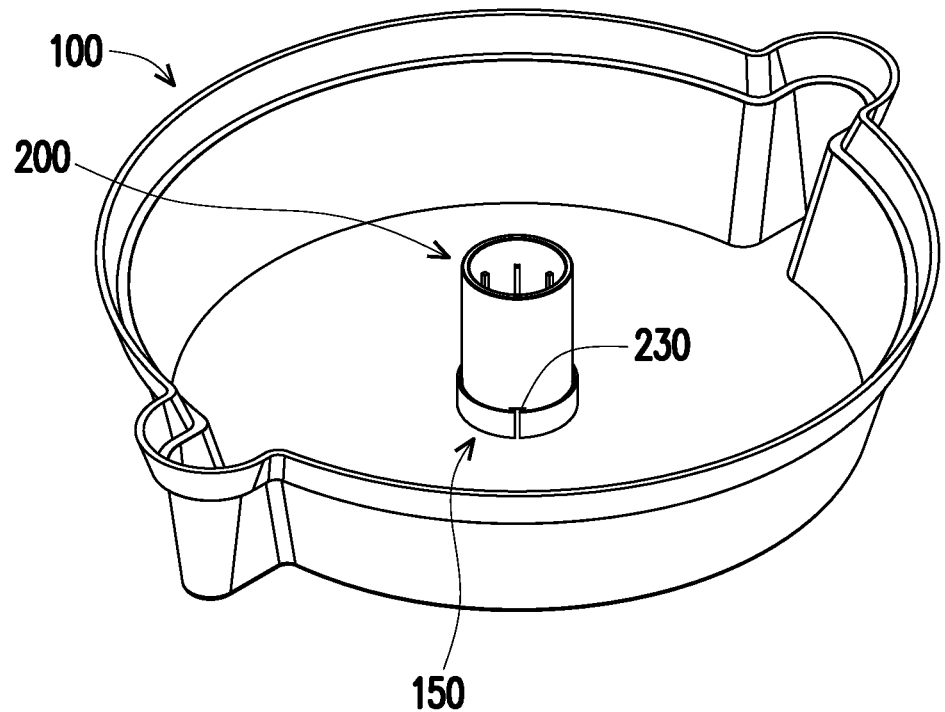
FIG. 2A is view showing a pot base and a connector of the self-watering pot base.
Figure 2B:
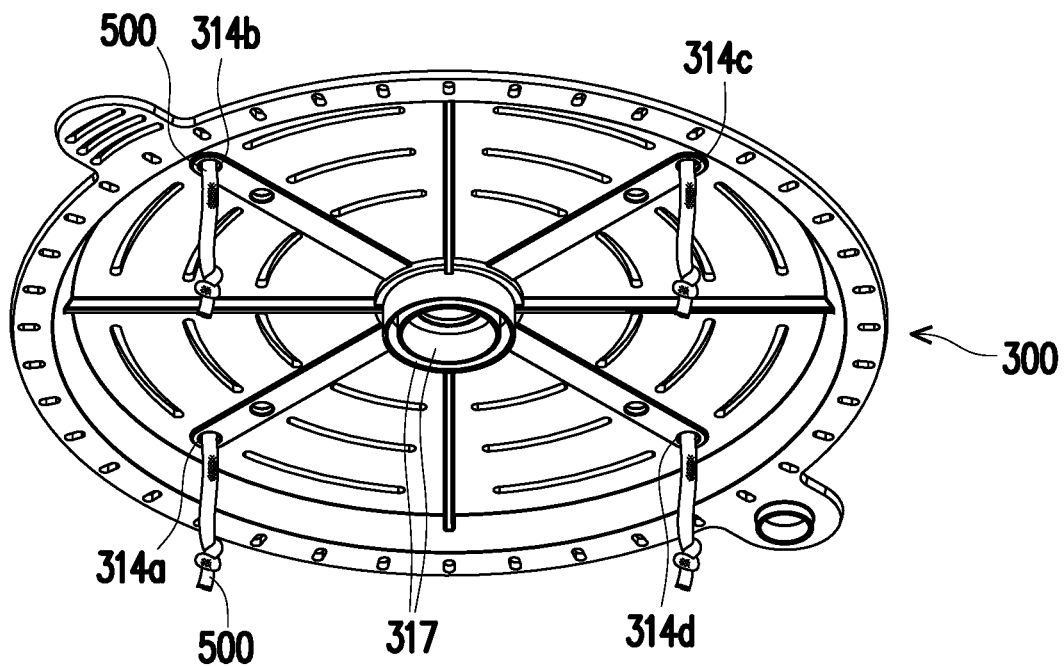
FIG. 2B is a view showing a lid and absorbent of the self-watering pot base.
Figure 2C:
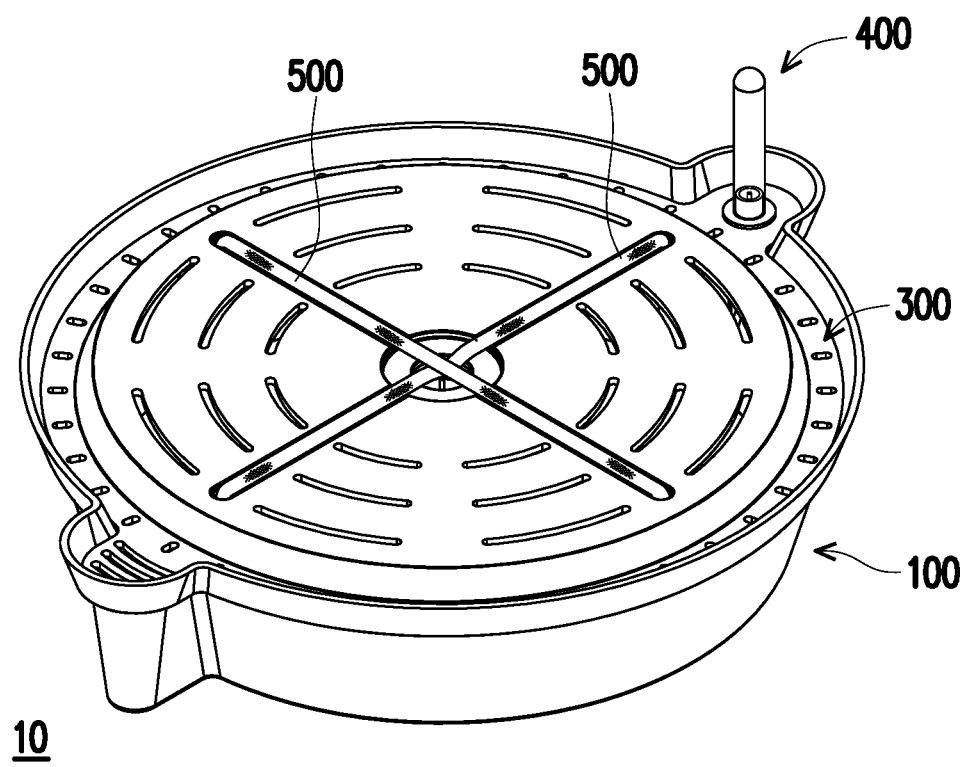
FIG. 2C is a view showing the self-watering pot base.

FIG. 2A is view showing a pot base 100 and a connector 200 of the self-watering pot base 10. FIG. 2B is a view showing a lid 300 and absorbent 500 of the self-watering pot base 10. FIG. 2C is a view showing the self-watering pot base 10.

Figure 3:
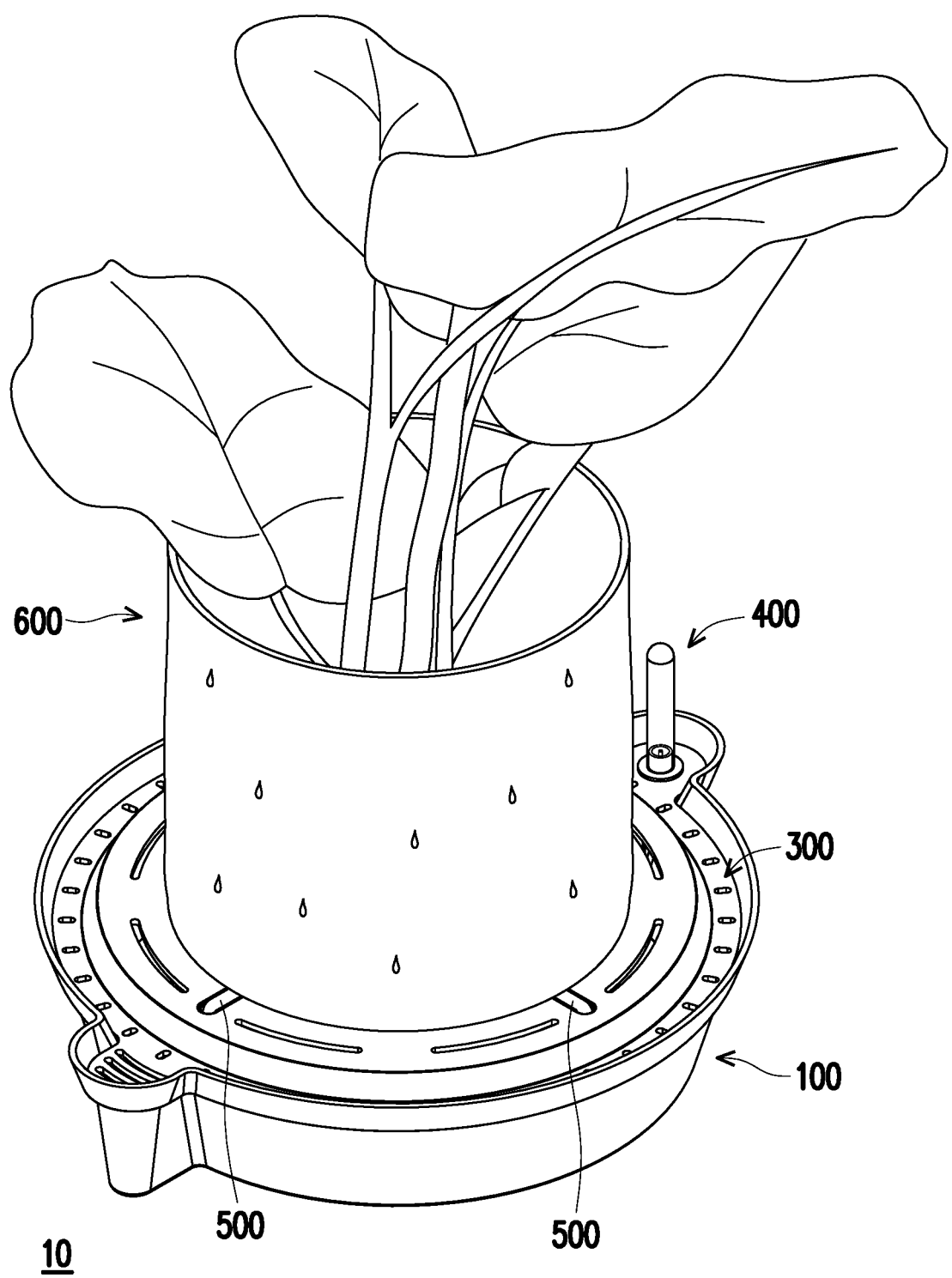
FIG. 3 is a view showing the self-watering pot base with a fabric pot.

Referring to FIGS. 2A-2C, the connector 200 is capable of being inserted into the pot base fixer 150 of the pot base 100. One of the absorbent 500 is passed through the absorbent hole 314a and the absorbent hole 314c. Another one of the absorbent 500 is passed through the absorbent hole 314b and the absorbent hole 314d. As shown in FIG. 3, coupling the lid 300 and the pot base 100 by inserting the connector 200 to the lid fixer 317 and installing the water gauge 400 to the water gauge hole 341.

FIG. 3 is a view showing the self-watering pot base 10 with the fabric pot 600.

Referring to FIGS. 1 and 3, locating the fabric pot 600 onto the lid 300. As such, as shown in FIG. 3, the liquid may fall down to the accommodation space 170 after the liquid is seeped out from the fabric pot 600. The absorbents 500 may absorb the liquid and transform the liquid back to the bottom of the fabric pot 600. The liquid here in the present application is not only limited in water, the liquid may comprise other elements such as nutrients.

In other words, when the roots reach the bottom of the fabric pot, the absorbents 500 may bring liquid from the accommodation space 170 to the top of the tray lid 300. The liquid will then be absorbed by the bottom of the fabric pot 600 and create a damp area around the bottom (around ¼ of the soil) of the fabric pot 600. It will keep a plant inside the fabric pot 600 being watered while keeping the top (around ¾ of the soil) of the fabric pot 600 dry. This dual root zone allows the roots on top to take in air and the roots on the bottom to take in liquid. It also keeps the top layer of soil dry to prevent bugs, mold and mildew from developing on the wet topsoil.

The user may review the water gauge 400 to know the amount of liquid inside the accommodation space 170. If there are too much of liquid, the user may drain liquid located inside the accommodation space 170.

Based on the above, different from the current technology that the water is accumulated in pot tray, the self-watering pot base of the present application prevent the bugs, mold and/or algae from breeding in the water by coupling a lid onto the pot base.

In addition, the absorbent may absorb the liquid inside the accommodation space, delivering the liquid from bottom to top of the fabric pot. As such, the top layer of the soil may not be damped for all the time, solving the issue of nested pests.

Furthermore, the self-watering pot base may also act as a water reservoir. The user may not need to water the plants until the water inside the self-watering pot base is depleted. The user may track the amount of water by reviewing the water gauge.

It will be apparent to those skilled in the art that various modifications and variations can be made to the structure of the present application without departing from the scope or spirit of the present application. In view of the foregoing, it is intended that the present application cover modifications and variations of this application provided they fall within the scope of the following claims and their equivalents.

What is claimed is:

1. A self-watering pot base comprising:
   a pot base comprising a pot base fixer;
   a lid removably coupled to the pot to form an accommodation space, the lid comprises a lid fixer, at least one leaking hole and at least one absorbent hole;
   a fabric pot placed on the lid;
   at least one absorbent passing through the at least one absorbent hole to reach the accommodation space to absorb liquid without contacting soil located inside the fabric pot, wherein part of the at least one absorbent is located between the fabric pot and the lid; and
   a connector inserted to the pot base fixer and the lid fixer when the lid is coupled to the pot base.

2. The self-watering pot base as claimed in claim 1, further comprising a water gauge coupled to the lid.

3. The self-watering pot base as claimed in claim 2, wherein the pot base further comprises a convex portion connecting to the accommodation space, wherein the lid further comprises a convex cover covering the convex portion.

4. The self-watering pot base as claimed in claim 3, wherein the convex cover comprises a water gauge hole, wherein the water gauge is passed through the water gauge hole.

5. The self-watering pot base as claimed in claim 1, wherein the pot base fixer is located at center of the pot base and the lid fixer is located at center of the lid.

6. The self-watering pot base as claimed in claim 1, wherein the lid further comprises at least one groove, wherein the at least one absorbent is located at the at least one groove.

7. The self-watering pot base as claimed in claim 6, wherein the at least one absorbent hole is located at the at least one groove.

8. The self-watering pot base as claimed in claim 1, wherein the lid further comprises at least one surrounding hole located at a lid edge of the lid.

9. The self-watering pot base as claimed in claim 1, wherein the lid further comprises a central hole.

10. The self-watering pot base as claimed in claim 1, wherein the self-watering pot base comprises two absorbents.

11. The self-watering pot base as claimed in claim 10, wherein the lid comprises two pairs of absorbent holes, wherein both ends of each of the absorbents is passed through one pair of the absorbent holes.

12. The self-watering pot base as claimed in claim 1, wherein the lid comprises a plurality of leaking holes concentrically located at the lid.

13. The self-watering pot base as claimed in claim 1, wherein the at least one absorbent is liquid-absorbable.

14. The self-watering pot base as claimed in claim 1, wherein the pot base comprises:
   a bottom;
   a first wall coupled to the bottom, wherein the accommodation space is formed by the bottom and the first wall;
   a pot base edge coupled to the first wall; and
   a second wall coupled to the pot base edge,
   wherein the lid comprises:
      a top panel;
      an inclined wall coupled to the top panel; and
      a lid edge coupled to the inclined wall, wherein the lid is coupled to the pot base by locating the lid edge onto the pot base edge.

15. A method of using the self-watering pot base of claim 1, comprising:
   coupling the lid and the pot base; and
   locating the fabric pot onto the lid.

16. The method of using the self-watering pot base as claimed in claim 15, wherein the self-watering pot further comprises a water gauge coupled to the lid, wherein after a step of locating the fabric pot onto the lid, the method further comprises reviewing the water gauge.

17. The method of using the self-watering pot base as claimed in claim 15, wherein after a step of locating the fabric pot onto the lid, the method further comprises draining liquid located inside the accommodation space.

* * * * *